United States Patent [19]
Nanba et al.

[11] 3,971,045
[45] July 20, 1976

[54] LIGHT MEASURING CIRCUIT

[75] Inventors: Yasuhiro Nanba, Osaka; Motonobu Matsuda, Izumi, both of Japan

[73] Assignee: Minolta Camera Kabushiki Kaisha, Japan

[22] Filed: Aug. 21, 1975

[21] Appl. No.: 606,542

[30] Foreign Application Priority Data
Aug. 21, 1974 Japan.................................. 49-95902

[52] U.S. Cl................................ 354/23 R; 354/51; 354/60 R; 356/226
[51] Int. Cl.²......................... G03B 7/08; G01J 1/44
[58] Field of Search ................. 354/22, 23, 24, 50, 354/51, 60 R; 356/218, 226, 223

[56] References Cited
UNITED STATES PATENTS
3,849,786  11/1974  Nanba et al. .......................... 354/51

3,879,740  4/1975  Mari et al. ............................ 354/24
3,883,882  5/1975  Mari .................................. 354/60 X FOREIGN PATENTS OR APPLICATIONS
2,129,935  12/1971  Germany .............................. 354/60

*Primary Examiner*—Joseph F. Peters
*Attorney, Agent, or Firm*—Watson, Cole, Grindle & Watson

[57] ABSTRACT

Light responsive circuit of low current consumption and low cost and used for camera exposure control and/or exposure indication. The circuit includes a field effect transistor, a photodiode connected between gate and source of the field effect transistor, a transistor having a collector connected to the gate of the field effect transistor and further having a base connected to the source of the field effect transistor, and a control circuit for controlling base voltage of the transistor to regulate source potential of the field effect transistor.

3 Claims, 5 Drawing Figures

LIGHT MEASURING CIRCUIT

BACKGROUND OF THE INVENTION

This invention relates to improvements in a light responsive circuit of a camera, in which a photo-diode is used as a light measuring element.

A light responsive circuit for a camera has been proposed, in which a photo-diode having good light responding characteristic is used as a light measuring element in place of a photo-conductive element such as cadimium sulfide (CdS). Among those attempts, there is one, as shown in FIG. 1, in which there is provided a differential amplifier A (or an operational amplifier) having a pair of input transistors T1, T2, such as field effect transistors (FET); a photo-diode PD1 is connected between the input terminals thereof; and the negative feedback is applied from the output terminal of the differential amplifier A by way of a diode D to its input terminal having the photo-diode connected thereto. The feedback brings both terminals of the photo-diode PD1 into a zero-voltage state as well as generating a shortcircuited current for the photo-diode. The amperage of the current is proportional to the brightness of light which is being received by the photo-diode PD1. The current thus produced is caused to flow through the aforesaid diode so as to obtain a voltage signal in proportion to the logarithm of the brightness of the light. For achieving a signal at a high accuracy in the prior art circuit shown in FIG. 1, it is mandatory that the characteristics of the two field effect transistors FET T1, FET T2 be in coincidence with each other. However, FET transistors having exactly the same characteristics are costly, thus leading to an increase in the cost of a camera. In addition, the circuit arrangement of FIG. 1 would be subject to a limitation in reducing a current to be consumed. This limitation is on the order of 100 $\mu$A at its minimum. The circuit, therefore, fails to meet the requirement that the storage cell be capable of being used for a long period of time.

Another prior art attempt is shown in FIG. 2, in which there is shown a circuit with a relatively simple arrangement, including a single FET T3. This arrangement, however, suffers from a disadvantage in that, at the time of the light measurement of an object placed in a dark region, a higher bias voltage having an opposite direction is impressed on a photo-diode, thereby producing a high dark current. As a result, a dark current component relative to a photo-electric component will be increased in the case of a dark object, so that a signal of a high accuracy may not be achieved, with the resulting circuit having poor responding characteristics.

In operation of the circuit shown in FIG. 2, at the time of light measurement, switches S1 and S2 are closed, switch S3 is opened, and current Ip of an amperage proportional to the brightness of an incident light flows from the source of FET T3 to photo-diode PD2 towards switch S2. There appears a gate bias voltage required for flowing a photo-electric current Ip from element PD2, across both terminals of PD2, i.e., across the gate sources of FET T3. In this case, the gate has a negative voltage relative to the source. When the aforesaid gate bias voltage is charged in condensor C1 and the light measurement is interrupted, then switches S1 AND S2 are opened, while switch S3 is closed, so that a current equal to the photo-electric current Ip is continued to be fed to a load Z. In this prior art circuit arrangement, as shown in FIG. 2, when incident light on photo-diode PD2 becomes dark and accordingly a photo-electric current is reduced, then this corresponds to the case where the gate of FET T3 is biased to a large extent, so that a higher bias voltage having an opposite direction will be impressed on photo-diode PD2. As a result, the darker the incident light, the further the dark current will increase within photo-diode PD2, thereby imparing the accuracy of a signal in a dark range, partly because of the reduction in the photo-electric current. A dark current as used herein is a current produced by a voltage having an opposite direction, rather than by the light. In addition, there is incurred a time lag due to the discharge of C1, upon abrupt change in the incident light, so that poor responding characteristics will result. On the other hand, because of the facts that a drain current is a photo-electric current Ip (including a dark current), and that the photo-electric current is small in amperage, FET T3 has to attend upon the control of a current of an extremely low amperage, resulting in fluctuations in the measurements in the dark region. For instance, a photo-electric current of several pAs is obtained for the brightness of 1/1000 lux measured on the light receiving surface of a photo-diode. It is quite difficult to consistently control such a minute current by means of an FET. The present invention is directed to avoid the aforesaid shortcomings confronted with the prior art light measuring circuit.

SUMMARY OF THE INVENTION

It is an object of the present invention to provide a light measuring circuit which is low in cost and which presents a signal with a high degree of accuracy in a wide light measuring range, with a reduced amount of a current to be consumed and a high responsive characteristics.

The primary feature of the present invention is that the source of FET is connected to the base of a transistor, and the gate of the aforesaid FET is connected to the collector of the aforesaid transistor, while there is provided a load circuit, such as a constant current circuit, at the source of the aforesaid FET, with a photo-diode connected between the gate and the source of the aforesaid FET.

DESCRIPTION OF THE PREFERRED EMBODIMENTS

Figure 1:
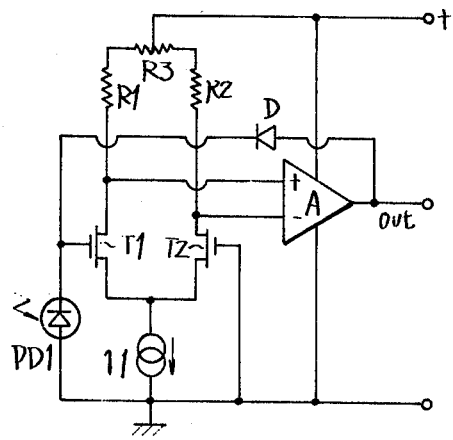
FIGS. 1 and 2 are schematic diagrams of prior art circuit arrangements.
Figure 2:
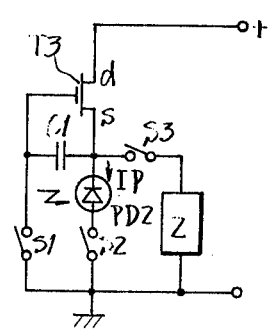
Figure 3:
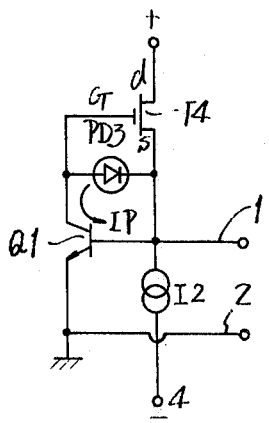
FIG. 3 is a diagram of a fundamental circuit according to the present invention.

FIG. 3 shows the fundamental arrangement of the circuit according to the present invention. A constant current circuit 12, which constitutes a load, is connected to a source S of FET T4, such that a majority of the current flowing through the drain source of FET T4 will be a current for circuit 12. A photo-diode PD3 is connected at its opposite terminals to gate G and source S, respectively, and the collector and base of a transistor Q1 are also connected to the gate and source, respectively. An output will be taken out from between the base and emitter of the transistor Q1.

Description will now be given of the operation of the circuit of FIG. 3. When light is incident on PD3, there is produced an electromotive force in PD3, so that a photo-electric current will flow from the source of FET T4 towards the collector of Q1. In this respect, the photo-electric current will be a current for the collector, i.e., for the emitter of transitor Q1. On the other hand, a constant current having a higher amperage than that of a photo-electric current is taken out from the source of FET T4 in the constant current circuit 12. However, this constant current is allowed to flow, only if gate G of FET T4 is suitably biased relative to source S. Under the actions of the constant current circuit 12 and transistor Q1, this bias current is set to a suitable value which insures a constant current for the constant current circuit. In other words, in the normal conditions, the gate of FET T4 is biased to an extent commensurate with a constant current from the constant current circuit. If, for one reason or another, a voltage at gate G of FET T4 tends to be increased, then the source current of FET T4 will be increased. However, since a current flowing through the constant current circuit 12 is limited to a given value, electric charges in excess will be accumulated in the base of transistor Q1, and accordingly its potential will be increased. As a result, a base current directed from the base of transistor Q1 towards the emitter thereof is increased, with a resulting increase in the collector current of transistor Q1. Since the collector current is a photo-electric current produced by photo-diode PD3, the collector current may be freely increased to an extent corresponding to the base current. Thus, the result is that transistor Q1 is brought into a further saturated state. In this manner, the potential of the collector of transistor Q1 is lowered and the increase in the potential of gate G of FET T4 connected thereto is suppressed.

Unlike the aforesaid case, when the potential of the gate of FET T4 tends to be lowered for one reason or another, then operations reversed to that of the aforesaid case will take place in the respective portions of the circuit. For this reason, the gate potential of FET T4 is biased so as to insure a constant current for constant current circuit 12.

In case the incident light on photo-diode PD3 is increased in its quantity, with an accompanying increase in the photo-electric current, the base current of transistor Q1 should be increased accordingly. Thus, with an increase in the photo-electric current, the collector potential of transistor Q1, i.e., the gate potential of FET T4, is increased, so that a source current will be increased. This then increases the base current of transistor Q1. Accordingly, the circuit is stabilized, remaining in the condition where the base current has been increased to a desired extend.

In this manner, a current of an amperage which increases or decreases depending on the incident light on the photo-diode, flows through the circuit leading from the collector to the base of transistor Q1, so that there appears a voltage of a level proportional to the logarithm of the collector current, across the base and the emitter of the transistor. With such a fundamental circuit, transistor Q1 is used in its state approximating the saturated range, with the result that a potential of the collector is lower than the transistor. Meanwhile, the same result may be obtained by using a further simpler circuit arrangement, in which circuit 12 is substituted by a resistor having a comparatively high resistance.

Figure 4:
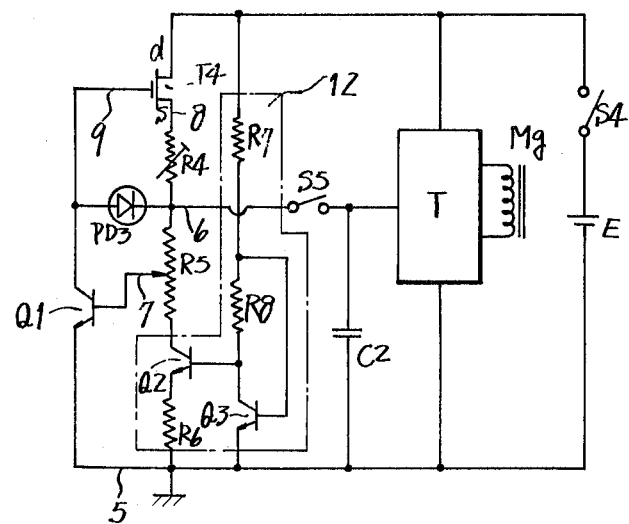
FIG. 4 is a circuit diagram showing one embodiment of the invention.

FIG. 4 shows a circuit diagram showing one embodiment of the invention. Like parts are designated like reference numerals throughout FIGS. 3 and 4. In this embodiment, transistor Q1 is operated in an active range.

Referring to the circuit arrangement shown in FIG. 4, the circuit constituted by transistors Q2, Q3 and resistors R6, R7, R8 forms constant current circuit 12 for providing a constant current through a collector circuit of transistor Q2, thus corresponding to circuit 12 of FIG. 3. Meanwhile, the current in the constant current circuit is so designed as to vary in proportion to the absolute temperature for compensating for the temperature characteristics of the logarithmical compression conversion. A semi-fixed resistor R4 connected at one end thereof to the source of FET T4 adjusts a gate bias voltage in FET T4 and a voltage impressed on the opposite ends of photo-diode PD3. A potentiometer R5 is connected between the other end of resistor R4 and the collector of transisotr Q2 and has its sliding terminal connected to the base of transistor Q1. Potentiometer R5 sets the exposure information other than the brightness information of an object, such as, for example, film sensitivity, preset diaphragm value and the like, by utilizing the aforesaid constant current flowing through resistor R4. The emitter of transistor Q1 is connected to a ground potential point 5. The light measuring output to be imparted as a signal output to transistor Q1 is taken out as a voltage across the function mid-point 6 of semi-fixed resistor R4 and resistor R5, and ground potential point 5. The major difference between the circuit of FIG. 4 and the fundamental circuit of FIG. 3 is than an additional DC circuit consisting of resistor R4 and potentiometer R5 is connected between the source of FET T4 and the constant current circuit as shown in FIG. 3. On the other hand, switch S5 is closed at the time of light measurement and opened before a mirror is moved upwards, upon releasing of the shutter in a single reflex camera. Shown at C2 is a so-called storing condensor which charges and stores an output provided across terminals 5 and 6 at the time of light measurement. Shown at T is an anti-logarithm conversion circuit which controls the exposure time commensurate with the stored voltage; circuit T can be a known circuit including a switching circuit. A magnet Mg controls a known shutter closing member connected to the output terminal of the switching circuit in circuit T. An electric power source cell E and an electric power source switch S4 are also connected in the circuit.

A description will now be provided of the operation of the circuit shown in FIG. 4. It is assumed that a constant current flows through the collector of transistor Q2, and further assumed that a sliding terminal 7 of potentiometer R5 is set to a given position. Since a constant current flows through resistors R4, R5, a voltage which is dependent on the resistance between source 8 of transistor T4 and sliding terminal 7 of resistor R5 is produced at the base of transistor Q1.

For insuring that a constant current will flow through T4, R4 and R5, it is necessary that a bias voltage be of a level commensurate with the constant current be impressed across source 8 and gate 9. This may be achieved according to the following feed-back operation, as in the case of the circuit of FIG. 3.

First assume that the circuit in question is in a normal operating state. If, for one reason or another, the potential of the collector (i.e., the gate of T4) is increased, then the source current is increased, so that the base current of transistor Q1 is increased. This then lowers the collector potential of transistor Q1, thereby eliminating the cause for the aforesaid trouble. Conversely, if a collector potential of transistor Q1 is decreased, these operations will be reversed.

Figure 5:
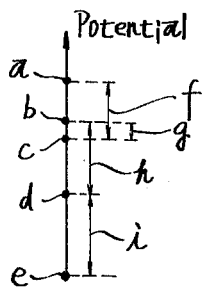
FIG. 5 is a view illustrating the relative potential levels at the respective points in the circuit of FIG. 4.

FIG. 5 shows an outline of the relationship with respect to the potential of the respective portions in the light measuring circuit. In FIG. 5, $a$ is the potential at the source of T4; $b$ the potential at the collector of transistor Q1 and thus also the potential at the gate of T4; $c$ the potential at the base of Q1; $d$ the potential at the emitter of Q1, or ground potential; $e$ the potential from a potential source; $f$ the gate bias voltage; $g$ the potential adjustment in such a manner that the potential will be brought to zero; $h$ a potential indicative of exposure information other than that of brightness; and, $i$ a potential indicative of brightness information.

As previously described, a gate bias voltage in T4 is automatically set to a suitable value. In case of voltage across source 8 and terminal 7 is varied by a shifting of sliding terminal 7 of potentiometer R5 or by changing the resistance of resistor R4, a voltage across the base and collector of Q1 is varied in the same direction under the aforesaid action, so that the gate bias voltage is maintained constant. When the resistance of resistor R4 is adjusted so as to render the voltage across both terminals of R4 equal to the gate bias voltage, then a voltage across the opposite ends of photo-diode PD3 is brought to zero. In short, photo-diode PD3 is brought into a condition approximating a short-circuited condition, so that a short-circuit current flows from PD3 into the collector of transistor Q1. In this case, the voltage across terminals 6 and 7 may be varied in an arithmitrical series manner in response to the variation around the first stage in film sensitivity. To this end, a constant current is caused to flow through potentiometer R5, so that resistance across terminals 6 and 7 is varied progressively by utilizing a potentiometer R5 for having a linear characteristic between the sliding point and the resistor, thereby obtaining an arithmetic series variation. Thus, there appears across terminals 5 and 6 a voltage equal to the sum of the voltage across the base and the emitter of Q1, which has been obtained by logarithmically compressing the brightness of an object, i.e., a voltage across terminals 7 and 5, and the voltage across terminals 6 and 7, which corresponds to exposure informations other than the information indicative of the brightness of an object.

The exposure information other than the brightness includes film sensitivity and a preset diaphragm value, in the case of a camera having an automatic exposure, AE, shutter with a fully opened shutter for light measuring, preferably such as of a diaphragm type. Likewise, in the case of a camera having an AE diaphragm of a shutter preferential type, film sensitivity and shutter speed are included in this additional information. In the latter case, the output across terminals 5 and 6 is imparted to a meter and the diaphragm value is determined depending on the deflection of a hand of the meter.

As is apparent from the foregoing description, the feature of the present invention is that the collector of transistor Q1 is connected to the gate of FET T4, the base of transistor Q1 is either directly or by way of a resistor to the source of FET T4, such as by a load circuit, for example, a constant current circuit 12, is connected on the side of the source, and a photo-diode PD3 is connected between the gate and the source.

According to the present invention, the collector is connected to the gate in the above described manner, and the base is connected to the source, thereby controlling the counterpart element so as to maintain constant the voltage across the gate sources, i.e., the voltage across the opposite ends of the photo-diode. In addition, a current flowing through the source is maintained constant by means of a load circuit so as to maintain the voltage across the gate sources constant in even a more precise manner, so that there may be achieved desirable responsive characteristics of the output voltage with respect to variations in light. The photo-diode has a capacity component, so that the variation in voltage across the opposite ends of the photo-diode leads to charge or discharge. The current attending upon charge or discharge is a photo-electric current from the photo-diode PD3, so that the photo-electric current is reduced or increased, which is to be taken out to the exterior, during the period in which charge or discharge is taking place, thus resulting in a delayed output relative to the input. If a voltage across the opposite ends of the photo-diode is maintained constant, neither a charging nor discharging may take place so that such a delay will not occur, thus presenting good light responsive characteristics. In addition, an adjusting resistor R4 may be provided in the source circuit to adjust the voltage across the opposite ends of the photo-diode, to substantially zero voltage, thereby taking out the short-circuit current, including the dark current, from the photo-diode. The short-circuit current is caused to flow through the collector of the transistor to produce a voltage, which has been logarithmically compressed, across the base and the emitter of the transistor. Accordingly, a potentiometer, or a variable resistor, R5 is provided between the source of FET and the constant current circuit to thereby cause a constant current to flow therethrough, so that exposure information other than that of the brightness may be added to the aforesaid brightness information which has been logarithmically compressed. In other words, the constant circuit 12 serves to maintain the voltage across the opposite ends of the photo-diode constant, to simplify a voltage-adjusting circuit between the opposite ends of the photo-diode and to be utilized for the computation of the exposure informations other than that of brightness.

As is apparent from the foregoing, the present invention presents a light measuring circuit which involves a minimized number of components in a sophisticated combination, thereby providing an arrangement having a relatively low cost but still good operating accuracy. The current to be consumed is the drain (source) current flowing through FET T4 and the current which flows through the resistor R7. However, this current may be set to no more than 30 $\mu$A, thus reducing the current to be consumed.

It is noted that the above description and the accompanying drawings are provided merely to present exemplary embodiments of the present invention and that additional modifications of such embodiments are possible within the scope of this invention without deviating from the spirit thereof.

We claim:
1. A light measuring circuit comprising:
a power source;

a photo-diode for generating photo-electric current as a function of light incident thereon;

a transistor having a base, an emitter and a collector, said collector being connected to one terminal of said photo-diode for receiving the photo-electric current therefrom;

an electrical load circuit;

a field effect transistor having its source connected to said power source through said electric load circuit, said field effect transistor having its gate coupled to the joint connection of said photo-diode and said collector of said transistor, said field effect transistor further having its source connected to the other terminal of said photo-diode;

a negative feedback circuit including said gate and source of said field effect transistor and said base of said transistor, said negative feedback circuit controlling the base potential of said transistor by a voltage signal produced at said source of said field effect transistor so as to counteract potential changes at the common junction point among said gate of said field effect transistor, said collector of said transistor and said one terminal of said photo-diode.

2. A light measuring circuit as defined in claim 1, wherein said load circuit includes means for generating constant current, said generating means being connected between said base of said transistor and said power source.

3. A light measuring circuit as defined in claim 2, wherein said load circuit further includes variable resistor means coupled to said generating means and adjustable in accordance with a sensitivity of a film to be utilized.

* * * * *